US008646071B2

(12) United States Patent
Pereira et al.

(10) Patent No.: US 8,646,071 B2
(45) Date of Patent: Feb. 4, 2014

(54) METHOD AND SYSTEM FOR VALIDATING SITE DATA (75) Inventors: Ryan Pereira, New South Wales (AU); Simon Clausen, New South Wales (AU); Ian Oliver, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 1703 days.

(21) Appl. No.: 11/832,922

(22) Filed: Aug. 2, 2007

(65) Prior Publication Data

US 2008/0034404 A1    Feb. 7, 2008

Related U.S. Application Data (60) Provisional application No. 60/835,935, filed on Aug. 7, 2006.

(51) Int. Cl.
H04L 29/06        (2006.01)

(52) U.S. Cl.
USPC ................................ 726/22; 726/2

(58) Field of Classification Search
USPC ........................................ 726/22, 2
See application file for complete search history.

(56) References Cited

U.S. PATENT DOCUMENTS

| | | | |
|---|---|---|---|
| 6,332,158 B1 * | 12/2001 | Risley et al. | 709/219 |
| 6,496,875 B2 * | 12/2002 | Cheng et al. | 710/1 |
| 6,826,690 B1 * | 11/2004 | Hind et al. | 713/186 |
| 6,907,525 B2 * | 6/2005 | Pazi et al. | 713/170 |
| 7,058,633 B1 * | 6/2006 | Gnagy et al. | 1/1 |
| 7,139,276 B1 * | 11/2006 | Sitaraman et al. | 370/401 |
| 7,171,683 B2 * | 1/2007 | Pazi et al. | 726/13 |
| 7,299,491 B2 * | 11/2007 | Shelest et al. | 726/4 |
| 7,313,815 B2 * | 12/2007 | Pazi et al. | 726/7 |
| 7,409,708 B2 * | 8/2008 | Goodman et al. | 726/13 |
| 7,493,403 B2 * | 2/2009 | Shull et al. | 709/229 |
| 7,529,810 B2 * | 5/2009 | Goto et al. | 709/219 |
| 7,620,733 B1 * | 11/2009 | Tzakikario et al. | 709/245 |
| 7,665,131 B2 * | 2/2010 | Goodman et al. | 726/13 |
| 7,752,656 B2 * | 7/2010 | Shuster | 726/4 |
| 7,761,583 B2 * | 7/2010 | Shull et al. | 709/229 |
| 7,921,211 B2 * | 4/2011 | Larson et al. | 709/226 |
| 7,945,654 B2 * | 5/2011 | Larson et al. | 709/223 |
| 2002/0145993 A1 * | 10/2002 | Chowdhury et al. | 370/338 |
| 2003/0070096 A1 * | 4/2003 | Pazi et al. | 713/201 |
| 2003/0110274 A1 * | 6/2003 | Pazi et al. | 709/229 |
| 2003/0177236 A1 * | 9/2003 | Goto et al. | 709/225 |
| 2004/0034797 A1 * | 2/2004 | Becker Hof | 713/201 |
| 2004/0098485 A1 * | 5/2004 | Larson et al. | 709/227 |
| 2004/0250119 A1 * | 12/2004 | Shelest et al. | 713/201 |
| 2005/0021997 A1 * | 1/2005 | Beynon et al. | 713/200 |
| 2005/0039104 A1 * | 2/2005 | Shah et al. | 714/776 |
| 2005/0044352 A1 * | 2/2005 | Pazi et al. | 713/153 |
| 2005/0102354 A1 * | 5/2005 | Hollenbeck et al. | 709/203 |
| 2006/0176822 A1 * | 8/2006 | Doyle et al. | 370/241 |

(Continued)

Primary Examiner — David Garcia Cervetti
(74) Attorney, Agent, or Firm — Holland & Hart LLP (57) ABSTRACT A method, and associated system and computer program product, of validating site data. The method includes the steps of, in a processing system 200, receiving 100 an indication of site data, performing a comparison 110 of the indication to site data criteria, and validating or invalidating 120 the indication based on a result of the comparison. The indication of site data could be at least part of a webpage, a link to a webpage, a Uniform Resource Locator, an IP address, at least part of an AJAX page, and/or at least part of a document.

15 Claims, 6 Drawing Sheets

(56) References Cited

U.S. PATENT DOCUMENTS

| | | | |
|---|---|---|---|
| 2008/0016025 A1* | 1/2008 | Beynon et al. | 707/1 |
| 2008/0040783 A1* | 2/2008 | Larson et al. | 726/7 |
| 2008/0172382 A1* | 7/2008 | Prettejohn | 707/6 |
| 2008/0201401 A1* | 8/2008 | Pugh et al. | 709/201 |
| 2009/0031033 A1* | 1/2009 | Deng et al. | 709/229 |
| 2009/0043765 A1* | 2/2009 | Pugh | 707/6 |
| 2009/0119402 A1* | 5/2009 | Shull et al. | 709/224 |
| 2009/0240792 A1* | 9/2009 | Ren | 709/221 |
| 2010/0049849 A1* | 2/2010 | Hershkovitz et al. | 709/224 |
| 2011/0247053 A1* | 10/2011 | Pugh | 726/4 |

* cited by examiner

METHOD AND SYSTEM FOR VALIDATING SITE DATA

This application claims the benefit of priority from U.S. Provisional Patent Application No. 60/835,935 filed Aug. 7, 2006, and is incorporated by referenced.

TECHNICAL FIELD

The present invention generally relates to the field of computing, and more particularly to a method, system, computer readable medium of instructions and/or computer program product for providing validation of site data, where the site data may have been affected by a malicious entity.

BACKGROUND ART

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

In a networked information or data communications system, a user has access to one or more terminals which are capable of requesting and/or receiving information or data from local or remote information sources. An example of a networked information or data communication system is the Internet.

In such a communications system, a terminal may be any type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may include or be associated with other devices, for example a local data storage device such as a hard disk drive or solid state drive.

An information source can include a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

In processing systems, and in particular, in networked systems, it is often the case that malicious entities may attack a user's terminal. Malicious entities can include malicious software, software threats, virus, trojans, cyber vandalism, or the like, where the malicious entity can be stored on the user's terminal, on a network, or a combination thereof.

In one example, a user accessing the Internet and viewing a website or the like, may be redirected and subjected to counterfeit information due to a malicious entity "hijacking" the user's requests for data via links on the website, via an address bar on a browser, or the like. A malicious entity may affect a user's request at the Domain Name Server (DNS) request level, or even if the information is correctly received and sent at the DNS level, by interception of the links on a displayed website pre/post presentation of the links to the user.

Domain Name Servers (DNS) accept easy to understand Internet Address strings, such as, for example, www.pctools.com into their unique numerical number on the Internet (Internet Protocol, or IP), in this case 210.15.241.16. Accordingly, when a user requests a website, they usually enter the domain name of the website in their web browser. A DNS server then translates the domain name into an IP address which allows for the website to be accessed.

Malicious entities may intercept a DNS request made by a system and send the user to an alternative illegitimate DNS. When a request is sent to the illegitimate DNS, then instead of returning the correct numerical Internet number of the computer to which to connect, the illegitimate DNS will return the address of another computer on the Internet which is illegitimate. Accordingly, this may cause the user to be directed to a website which is similar to the one to which they expected to be connected to, based on the type of link selected by the user, thereby causing inconvenience to or misleading the user.

Furthermore, following reception of data from a network containing links that are presented to the user in a browser (or some other form), and after a user has selected a link that is used as part of a request to be sent over a network but before it is sent, the opportunity exists for the links to be intercepted and changed by a malicious entity.

Thus, for example, a malicious entity may redirect a user by changing links on a legitimate page received by a trusted DNS, but prior to the links being displayed to the user. This can include attacking and changing the script of the page that is being displayed to the user.

In another example, the link on a webpage may be displayed and sourced correctly, however, after the user has selected the link, but prior to resolving of the link by a DNS request and the transmission of a request based on the resolved link, the link is changed by a malicious entity. In this case, it is often difficult to realise that a request has been made to an illegitimate DNS.

Accordingly, there exists a need for a method, system, computer readable medium of instructions, and/or a computer program product to provide validation for site data, which addresses or at least ameliorates one or more problems inherent in the prior art.

DISCLOSURE OF INVENTION

According to a first broad form, there is provided a method of validating site data, the method including the steps of, in a processing system: receiving an indication of site data; performing a comparison of the indication to site data criteria; and, validating or invalidating the indication based on a result of the comparison.

According to a second broad form, there is provided a system for validating site data, the system including at least one processor configured to receive an indication of site data, perform a comparison of the indication to site data criteria, and validate or invalidate the indication based on a result of the comparison.

According to a third broad form, there is provided a computer program product for validating site data, the computer program product able to be executed on a processing system and configured to: receive an indication of site data; perform a comparison of the indication to site data criteria; and, validate or invalidate the indication based on a result of the comparison.

According to a particular aspect, the indication of site data is selected from the group consisting of at least part of a webpage, a link to a webpage, a Uniform Resource Locator, an IP address, at least part of an AJAX page, and at least part of a document.

According to a further particular aspect, the site data criteria is selected from the group consisting of at least part of a webpage, a link to a webpage, a Uniform Resource Locator, an IP address, at least part of an AJAX page, and at least part of a document.

In a particular example form, the indication is an IP address, the site data criteria is a range of IP addresses, and the comparison is whether the IP address is within the range of IP addresses.

In another particular example form, the indication is an IP address and the comparison is whether the IP address varies by a specified amount from the user's present IP address.

In various embodiments, the site data criteria is retrieved from a database associated with the processing system, and/or the site data criteria is retrieved from a database remote to the processing system.

In still further optional embodiments, if the indication is not validated, notifying a user of the invalid indication of site data, and/or resetting the invalid indication of site data to be a trusted indication of site data.

According to other forms, the present invention provides a non-transitory computer readable medium of instructions or a computer program product for giving effect to any of the methods or systems discussed herein. In one particular, but non-limiting, form, the computer program product is a software program.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Figure 1:
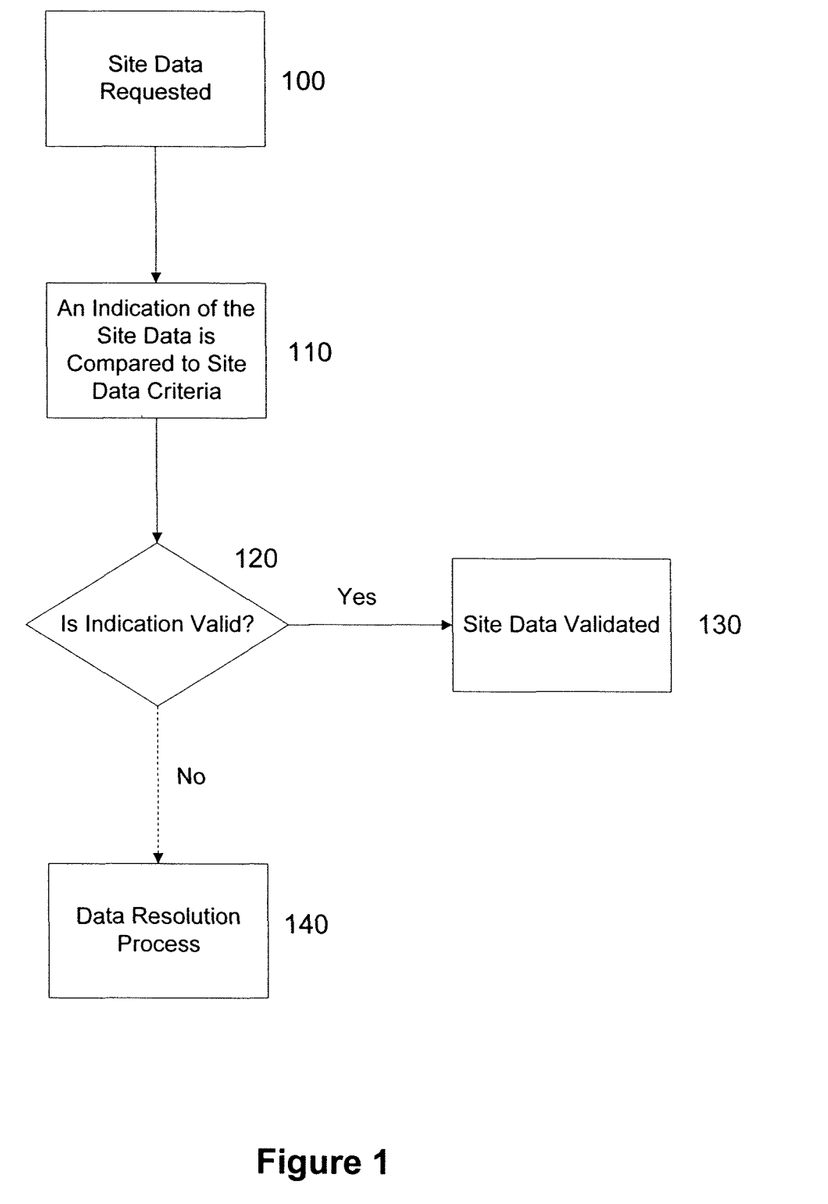
FIG. 1 illustrates a flow diagram of an example method for validating site data.

A method of validating site data is shown in FIG. 1. The method generally includes receiving an indication of site data at step 100, where the indication of the site data is compared to site data criteria at step 110. The indication of site data is validated or not validated (i.e. invalidated) at step 130, in accordance with the results of the comparison. Optionally, if the indication is not valid, the process may continue to a data resolution process at step 140.

Figure 2:
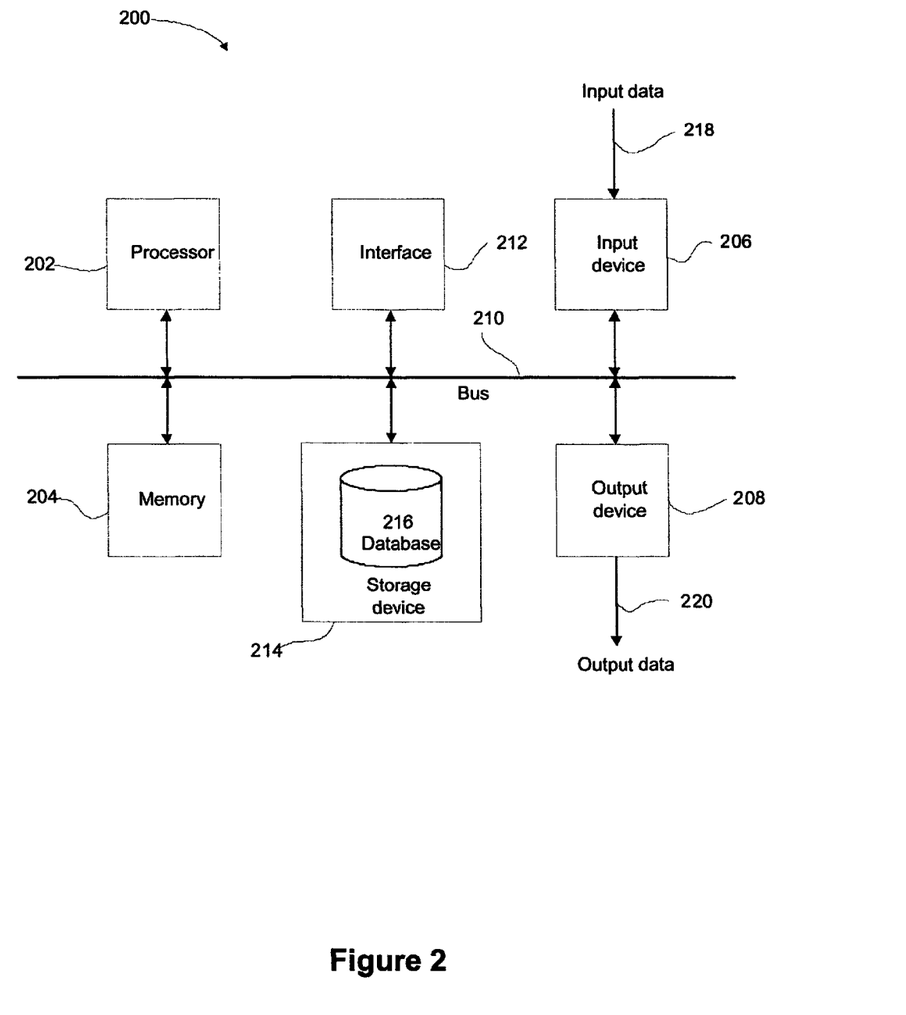
FIG. 2 illustrates a functional block diagram of an example processing system that can be utilised to embody or give effect to a particular embodiment.

The process of FIG. 1 can be realised using a processing system, an example of which is shown in FIG. 2. In particular, processing system 200 generally includes at least one processor 202, or processing unit or plurality of processors, memory 204, at least one input device 206 and at least one output device 208, coupled together via a bus or group of buses 210. In certain embodiments, input device 206 and output device 208 could be the same device. An interface 212 can also be provided for coupling processing system 200 to one or more peripheral devices, for example interface 212 could be a PCI card or PC card. At least one storage device 214 which houses at least one database 216 can also be provided. The memory 204 can be any form of memory device, for example, volatile or non-volatile memory, solid state storage devices, magnetic devices, etc. The processor 202 could include more than one distinct processing device, for example to handle different functions within the processing system 200.

Input device 206 receives input data 218 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 218 could come from different sources, for example keyboard instructions in conjunction with data received via a network. Output device 208 produces or generates output data 220 and can include, for example, a display device or monitor in which case output data 220 is visual, a printer in which case output data 220 is printed, a port for example a USB port, a peripheral component adaptor, a data transmitter or antenna such as a modem or wireless network adaptor, etc. Output data 220 could be distinct and derived from different output devices, for example a visual display on a monitor in conjunction with data transmitted to a network. A user could view data output, or an interpretation of the data output, on, for example, a monitor or using a printer. The storage device 214 can be any form of data or information storage means, for example, volatile or non-volatile memory, solid state storage devices, magnetic devices, etc.

In use, the processing system 200 is adapted to allow data or information to be stored in and/or retrieved from, via wired or wireless communication means, the at least one database 216, and also for processes or software modules to be executed. The interface 212 may allow wired and/or wireless communication between processing unit 202 and peripheral components that may serve a specialised purpose. The processor 202 receives instructions as input data 218 via input device 206 and can display processed results or other output to a user by utilising output device 208. More than one input device 206 and/or output device 208 can be provided. It should be appreciated that the processing system 200 may be any form of terminal, server, specialised hardware, or the like.

Processing system 200 may be an isolated system when validating site data. However, if appropriate, processing system 200 may be a part of a networked communications system. Processing system 200 could connect to a network, for example the Internet or a WAN. Input data 218 and/or output data 220 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing system 200 can receive an indication of a site data request, compare the indication of the site data request to site data criteria, and validate the site data request in accordance with the results of the comparison.

It will be appreciated that the processing system 200 can be a user terminal, where a process, for example provided by a software program, or the running of a computing operation, or the like, can execute the method illustrated in FIG. 1 on the user terminal. However, the processing system 200 can also be a separate system to the user terminal and may monitor the user terminal remotely.

In any event, the processing system 200 receives an indication of site data. The indication can include that the user has selected a webpage, requested or received an IP address of a webpage from a DNS, selected a link, or the like. Thus, in one example, the site data requested by the user can be a webpage, a link, a Uniform Resource Locater (URL), a document, or the like.

Once the processing system 200 has received an indication of site data, the processing system 200 can compare or check the indication of site data to or against site data criteria. The site data criteria can include whether or not the DNS requested by the user is valid, whether the link's URL request by the user is valid, etc.

The site data criteria can be stored on a separate or remote database to the processing system 200, however, in one example, the site data criteria is stored in database 216. The site data criteria can be predetermined by the user or a third party, previously stored, or can be machine-learned as the user accesses various sites. The site data criteria, can thus be periodically or randomly updated.

Validating the site data by way of an indication of the site data can include confirming that the indication (after a user's request for site data) is valid or determining that the indication is invalid. If it is determined that the indication is valid, then the user can then be allowed to access the site data the user requested, and the process can end.

However, if it is determined that the indication of site data is invalid, the process may continue to a data resolution process, which can include warning, notifying or alerting the user to the invalid site data. The user can then be given the option to accept the invalid site data or reject the invalid site data. Alternatively, the process may include resetting the invalid site data to known or trusted site data (such as, for example, using a trusted DNS).

Accordingly, the above described method and system can be used to validate site data, in order to determine whether a malicious entity or the like has affected, corrupted, or intercepted site data requested by a user.

FURTHER EXAMPLES

The following examples provide a more detailed description of particular embodiments. The examples are intended to be merely illustrative and not limiting to the scope of the present invention.

Example Implementations at DNS Level

Example 1

Figure 3:
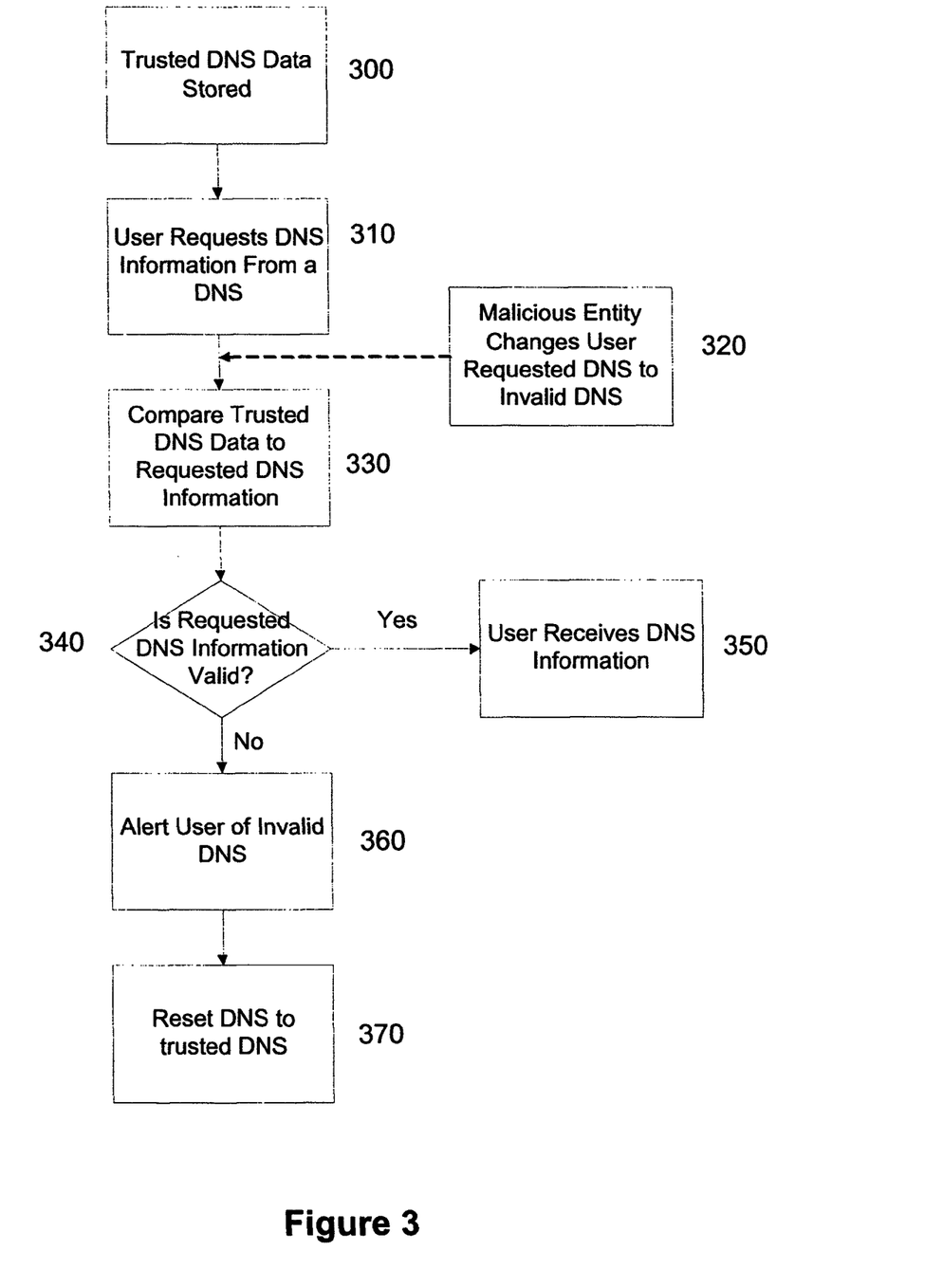
FIG. 3 illustrates a flow diagram of a further example of another embodiment of validating site data.

FIG. 3 shows an example implementation of determining whether a malicious entity has attacked a user's request for site data at the DNS level. At step 300 trusted DNS data/information is stored (and can be stored in the database 216 of the processing system 200). At step 310 a user requests DNS data/information (i.e. a request to receive an indication of site data) from a DNS. It is possible, that at this stage, at step 320, a malicious entity can change the user's requested DNS data/information to invalid DNS data/information. Accordingly, at step 330 the trusted DNS data/information is compared to the requested DNS data/information. At step 340 it is determined whether the requested DNS data/information is valid.

If the requested DNS information is valid, the user can then receive the DNS information at step 350. Otherwise, at step 360 the user can be alerted to the invalid DNS, and the invalid DNS can be reset to the trusted DNS at step 370.

Accordingly, in a particular implementation, the following steps may be performed:

1) When the system is not infected the DNS IP address (numerical no) is recorded.
2) The registered owner and IP range of this IP address is also recorded.
3) If a DNS request is made to a DNS with a different number than the number recorded at step (1) and the number is not in the range found at (2) then one or more of the following may optionally be performed:
   a) The user is alerted that a different DNS is being used and the "who is" and geographical location of the new DNS is communicated to the user, as well as it's numerical difference from the original, ie. whether it is close to the range or far from the range. Notably, the "who is" and geographical location of the new DNS can be obtained from a known database such as Inter-NIC (Internet Network Information Centre)
   b) The user is given the option of allowing the DNS request.
   c) A DNS is requested by the processing system 200 to see whether the DNS hijack is a system wide DNS Hijack or whether the attack has come from one program on the user's processing system. If this is the case, the user may also try to block the program responsible.
   d) The user is also told the program that made the suspected DNS request as this may be helpful in understanding whether to accept the request or not.
   e) The DNS is reset to the old (trusted) DNS. However, a check is also made to ensure that the old DNS is still connected to the Internet.

Notably, it may be possible that the DNS has been changed as the result of Dynamic Host Configuration Protocol (DHCP) transaction. Thus, if this is the case, the process can also include checking to see whether a valid DHCP transaction has occurred, and notifying the user accordingly.

Example 2

Figure 4:
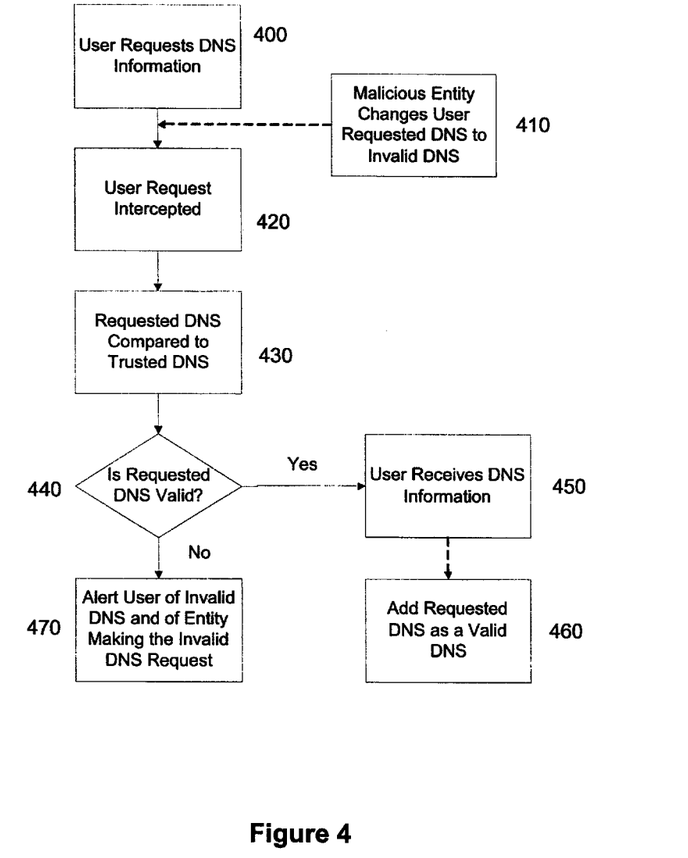
FIG. 4 illustrates a flow diagram of a further example of another embodiment of validating site data.

Another example implementation is shown in FIG. 4. At step 400 a user requests DNS data/information, where at step 410 a malicious entity can change the user's requested DNS data/information to an invalid DNS data/information. The user's request can be intercepted at step 420 (in one example, by processing system 200, a program on the user's terminal, or the like). At step 430 the requested DNS data/information is compared to a previously determined trusted DNS data/information.

At step 440 it is determined whether the trusted DNS data/information is valid. If the trusted DNS data/information is valid, at step 450 the user receives the DNS data/information, and the requested DNS data/information can also be added as valid DNS data/information at step 460. If the DNS data/information is not valid, then at step 470 the user can be alerted to the invalid DNS data/information and the entity that is making the invalid DNS request.

Accordingly, in a particular implementation, the following steps may be performed:
1) Each time a DNS request is made, the processing system 200, a program on the user's terminal, or the like may intercept the request;
2) The same DNS request is also sent to a trusted DNS;
3) The results of request (1) and request (2) are compared;
4) When a difference is found between the results, the difference is reported to the user as a possible hijack along with the program/system name making the DNS request. It may also be logged or sent to a server or blocked;
5) The program that made the request can optionally be reported to the user, logged or sent to a server or terminated;
6) Optionally, the DNS request results are stored in a cache. For each request a "whois" database search is performed; and:
   a) the entire IP range registered is added to an allow list of valid addresses;
   b) in a variation of (a), the IP range is only stored if it belongs to a known company entered in a predetermined list AND the IP range is not stored if the IP range is for an organisation such as an ISP where it is impossible to know if the whole IP range can be trusted;
7) Optionally, a list of valid URLs and their IP ranges are stored in a database for either commonly accessed URLs or for URLs which are determined to be especially protected. When a DNS request for a URL in the database produces a result that varies from the IP range for this URL as specified in the database then this is reported as suspect. Notably, the database of valid URLs may be periodically updated;
8) In another example, whenever a request is made to a different DNS an alert is only raised if the DNS is from a range varying by a specified amount from the users present IP address.

Notably, although the above methods have been described in respect of a DNS, it will be appreciated by persons skilled in the art that the DNS can be any type of secondary processing system, including but not limited to Windows Internet Naming Service (WINS), and other alternate DNS.

Example Implementations at Link Level

Example 1

Protect from Change of the URL Information on the Way in

Figure 5:
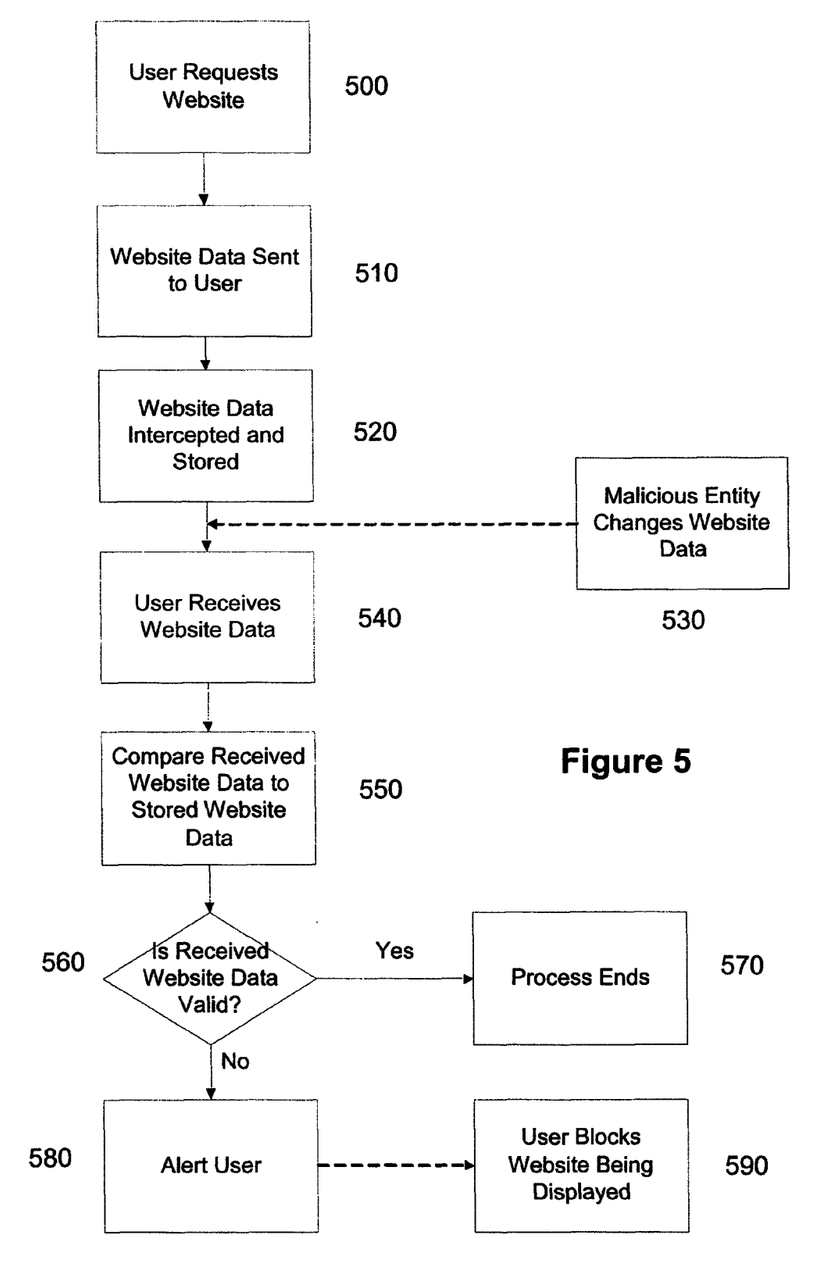
FIG. 5 illustrates a flow diagram of a further example of another embodiment of validating site data.

An example process for protecting a change to a link is shown in FIG. 5. At step 500 a user requests a website, webpage, or the like. At step 510, website data associated with the requested website is sent to the user. At step 520 the website data sent to the user is intercepted by the processing system 200, or a program on the user's terminal, and is stored. At this stage, a malicious entity can change the website data, prior to the website data being displayed to the user, at step 530.

At step 540 the user receives the website data. At step 550 the received website data is compared to the previously stored website data. At step 560 it is determined whether the website data is valid. If the website data is valid, then the process ends at step 570. Otherwise, the user can be alerted at step 580 and the user can optionally block the website being displayed at step 590.

Accordingly, in a particular implementation, the following steps may be performed:
1) Network traffic received is intercepted and all data that can be displayed to the user including but not limited to HTML pages is scanned and the URL(s) and text presented to the user associated with the link are recorded in a database/list. These text and links are then guarded against changes.
2) Either during the final stages of rendering the links or immediately after display of the links and associated text, a check is made to see whether anything has been changed.
3) Changes found at (2) are reported to any or all of the following (but not limited to these only),
   a) the user with the option to continue or block,
   b) a central server for checking how suspect the change is and the developing of trending information so that a hijack alert can be sent to users or the Internet community.
4) Optionally, other information in addition to the URL(s) and text may be tagged for guarding.
5) Optionally, the check (2) could be done at the point where the user selects a link by for example, but not limited to, clicking on it.
6) Optionally, a database of information for organisations to be protected may be used to guard only these links or to provide extra information or immediate notification to these organisations if a hijack occurs.

Example 2

Protect from Change in the URL Information on the Way Out

Figure 6:
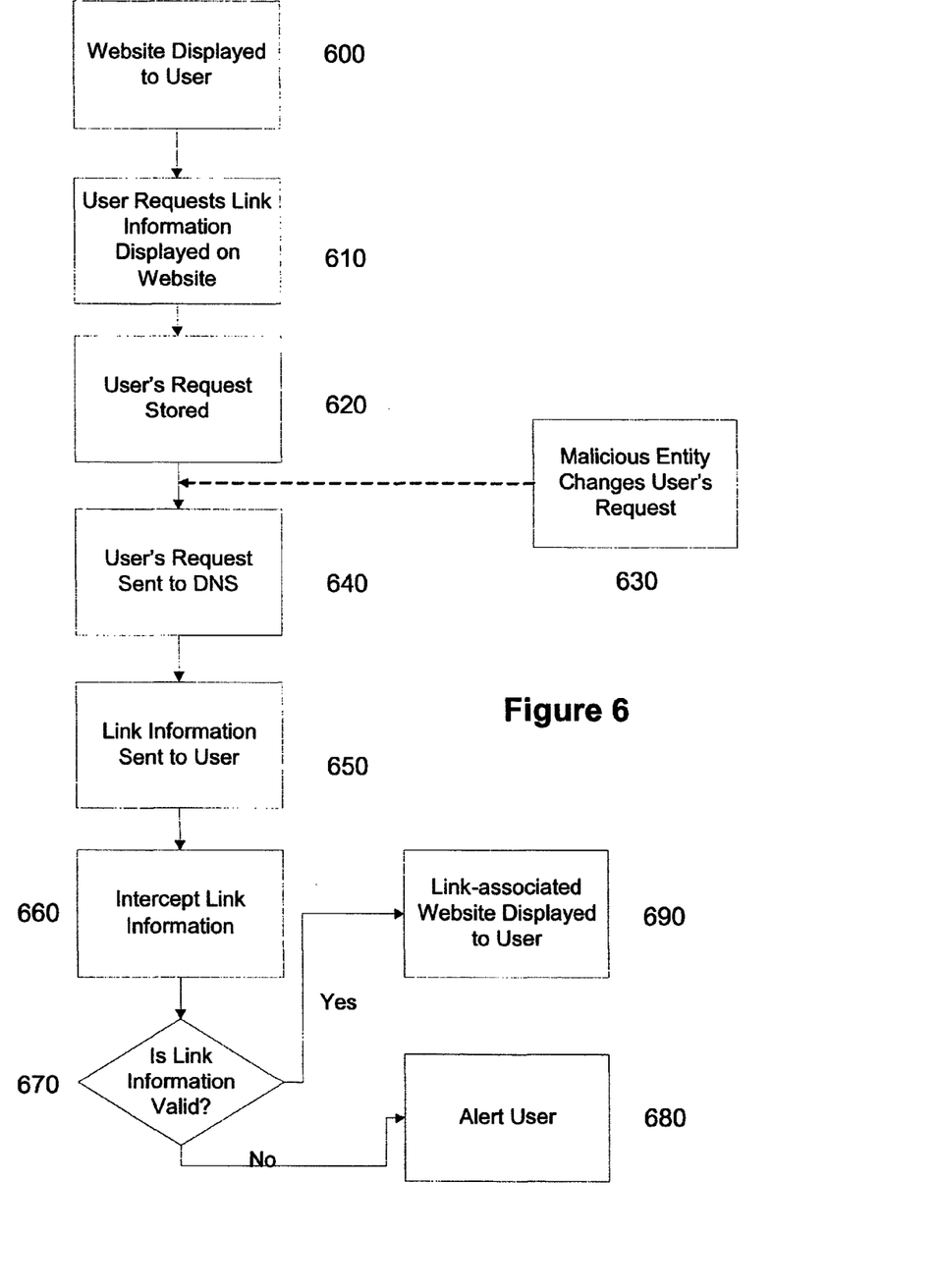
FIG. 6 illustrates a flow diagram of a further example of another embodiment of validating site data.

FIG. 6 shows another example process for protecting a change to a link. At step 600 a website is displayed to a user. At step 610 the user requests link information, which is displayed on the website. The user's request is stored at step 620. At step 630, a malicious entity may change the user's request. At step 640 the user's request is sent to a DNS, where at step 650 the link information is sent to the user. At step 660 the link information is intercepted in order to determine whether the link information is valid at step 670. If the link information is valid, then at step 690, a link-associated website is displayed to the user. Otherwise, at step 680 the user is alerted to the invalid link information.

Notably, the following method can be used so that it is assumed that the URL information displayed to the user is valid. Accordingly, in a particular implementation, the following steps may be performed:
1) When a URL is selected, the request is added to a second database/list. One way to achieve this selection of a link event is to hook the request. Notably, a hook is generally a callback function provided by a software application that receives certain data before the normal or intended recipient of the data. A hook function can thus examine or modify certain data before passing on the data. Therefore, a hook function allows a software application to examine data before the data is passed to the intended recipient.
2) Network traffic transmitted is intercepted and one of the following is optionally performed:
   i) a check is made to see that the request is sent within a certain period of time;
   ii) specifically only the process/entity from which (1) occurred is checked to so that the link is sent within a certain period of time.

3) If the request is not found then this can be reported:
   i) to the user with information about the request which was not sent and also optionally the request that was sent instead of the expected request at the point of selection by the user, by monitoring the specific process in 2(ii);
   ii) to a central server for checking how suspect the change is and the developing of trending information so that a hijack alert can be sent to users or the Internet community.

In the examples described above, the form of checking may include (but is not limited to):
a) an exact match of the URL(s);
b) a match which ensures at least that the links being compared fall within the same domain or range of IP address belonging to the same organisation;
c) a match which ensures at least that the links compared fall within the IP ranges as specified in allowed ranges for specific organisations as stored in a database of protected organisations.

According to a further example, the present invention can be applied to AJAX pages as a form of AJAX page guard. AJAX is an acronym for Asynchronous JavaScript and XML, a web development technique for creating interactive web-based applications. An AJAX page is meant to be more responsive by exchanging relatively small amounts of data with a server, so that the entire web page does not have to be reloaded each time a user makes a change.

However, AJAX pages are vulnerable by changes to: Active X objects; the code (as AJAX should bring a new importance to the code of pages and not just links); and the links (i.e. the outgoing request code or URL could be changed to intercept data, such as login data). Thus, in this form, site data should be taken to include Active X objects, page code and/or links.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A method of validating site data, the method including the steps of, in a processing system:
   storing, by the processing system, a verified Internet Protocol (IP) address for a valid Domain Name System (DNS) server;
   intercepting, by the processing system, a request for an indication of site data, wherein the request is directed to an IP address of an unverified DNS server;
   comparing, by the processing system, the IP address with the stored verified IP address;
   upon determining that the IP address matches the verified IP address, transmitting, by the processing system, the request to the IP address indicated in the request;
   receiving, by the processing system, an indication of site data;
   performing, by the processing system, a comparison of the indication to site data criteria;
   validating or invalidating the indication based on a result of the comparison; and
   when the indication is invalid, resetting the invalid indication of site data to a trusted indication of site data.

2. The method as claimed in claim 1, wherein the indication of site data is selected from the group consisting of at least part of a webpage, a link to a webpage, a Uniform Resource Locator, an IP address, at least part of an AJAX page, and at least part of a document.

3. The method as claimed in claim 2, wherein the site data criteria is selected from the group consisting of at least part of a webpage, a link to a webpage, a Uniform Resource Locator, an IP address, at least part of an AJAX page, and at least part of a document.

4. The method as claimed in claim 1, wherein the indication is an IP address, the site data criteria is a range of IP addresses, and the comparison is whether the IP address is within the range of IP addresses.

5. The method as claimed in claim 1, wherein the indication is an IP address and the comparison is whether the IP address varies by a specified amount from the user's present IP address.

6. The method as claimed in claim 1, wherein the indication and the site data criteria are Uniform Resource Locators and the comparison requires an exact match of the Uniform Resource Locators.

7. The method as claimed in claim 1, wherein the site data criteria is retrieved from a database associated with the processing system.

8. The method as claimed in claim 1, wherein the site data criteria is retrieved from a database remote to the processing system.

9. The method as claimed in claim 1, wherein if the indication is not validated, notifying a user of the invalid indication of site data.

10. The method as claimed in claim 9, wherein the user is informed of the program name that made the invalid indication.

11. The method as claimed in claim 1, wherein the indication is a link to a webpage and if the indication is validated, displaying the webpage on a user terminal.

12. The method as claimed in claim 11, wherein the webpage is only displayed if the indication is validated within a set period of time.

13. The method as claimed in claim 1, wherein the indication is a link to a webpage and the steps of performing the comparison and validating the indication are only performed if a user clicks on the link.

14. A system for validating site data, the system including at least one processor configured to:
   store a verified Internet Protocol (IP) address for a valid Domain Name System (DNS) server;
   intercept a request for an indication of site data, wherein the request is directed to an IP address of an unverified DNS server;
   compare the IP address with the stored verified IP address;
   upon determining that the IP address matches the verified IP address, transmit the request to the IP address indicated in the request;
   receive an indication of site data;
   perform a comparison of the indication to site data criteria;
   validate or invalidate the indication based on a result of the comparison; and
   when the indication is invalid, reset the invalid indication of site data to a trusted indication of site data.

15. A computer program product for validating site data, the computer program product comprising a non-transitory computer-readable medium with instructions thereon, the instructions comprising:
- code programmed to store a verified Internet Protocol (IP) address for a valid Domain Name System (DNS) server;
- code programmed to intercept a request for an indication of site data, wherein the request is directed to an IP address of an unverified DNS server;
- code programmed to compare the IP address with the stored verified IP address;
- upon determining that the IP address matches the verified IP address, code programmed to transmit the request to the IP address indicated in the request;
- code programmed to receive an indication of site data;
- code programmed to perform a comparison of the indication to site data criteria;
- code programmed to validate or invalidate the indication based on a result of the comparison; and
- when the indication is invalid, code programmed to reset the invalid indication of site data to a trusted indication of site data.

\* \* \* \* \*